United States Patent [19]

Rukes

[11] 4,358,229
[45] Nov. 9, 1982

[54] CYLINDER BORING MACHINE STAND

[76] Inventor: Dale H. Rukes, 4450 Caterpillar Rd., Redding, Calif. 96001

[21] Appl. No.: 187,362

[22] Filed: Sep. 15, 1980

Related U.S. Application Data

[63] Continuation-in-part of Ser. No. 26,198, Apr. 2, 1979, abandoned.

[51] Int. Cl.³ .............................................. B23B 41/12
[52] U.S. Cl. ........................................ 408/88; 408/95; 408/237; 408/709; 404/190
[58] Field of Search ..................... 409/190, 205, 206; 408/72 R, 87, 88, 95, 98, 100, 101, 115 R, 234, 709, 89, 99, 103, 113, 236, 237; 51/241 B, 241 S

[56] References Cited

U.S. PATENT DOCUMENTS

| | | | |
|---|---|---|---|
| 1,586,500 | 5/1926 | Bacon et al. | 408/709 X |
| 1,869,514 | 8/1932 | Scitz | 408/237 |
| 2,486,813 | 11/1949 | Yount | 408/53 |
| 2,546,957 | 3/1951 | Ray | 408/88 |
| 2,669,135 | 2/1954 | Moore | 408/234 X |
| 3,053,119 | 9/1962 | Anderson | 408/89 |
| 3,273,423 | 9/1966 | Rottler | 408/98 X |

FOREIGN PATENT DOCUMENTS 2420273 11/1975 Fed. Rep. of Germany ...... 408/236

Primary Examiner—Z. R. Bilinsky
Attorney, Agent, or Firm—Alfons Puishes

[57] ABSTRACT

An apparatus facilitates the support and positioning of an engine block for the purpose of boring the cylinders thereof and the support and positioning of the boring machine used simplifies the operation and permits it to be performed with greater ease, safety and precision. A novel method of suspension of the boring machine over the engine block simplifies the raising and lowering of the machine by levelling it and automatically effecting the proper alignment to insure the accuracy of the boring operation.

12 Claims, 11 Drawing Figures

CYLINDER BORING MACHINE STAND

This application is a continuation-in-part of my application Ser. No. 026,198 filed Apr. 2, 1979, now abandoned.

BACKGROUND OF THE INVENTION

The process of boring automotive cylinders in connection with their reconditioning by means of portable boring machines has been practised for many years. As presently performed, the process is accompanied by a certain amount of hazard to the operators, is somewhat cumbersome and presents problems in obtaining the proper position of the work.

The prior patent art as known to applicant is set forth below.

U.S. Pat. No. 3,053,119 to Anderson discloses a stand upon which an engine block may be mounted on a cross-bar which in turn is supported on pedestals with means for rotating the engine about its horizontal axis permitting the boring machine to be centered over the cylinder to be bored by means of suitable gauges. This device is primarily adapted to permit angular positioning of the cylinder and does not include any of the devices incorporated in applicant's apparatus.

U.S. Pat. No. 2,486,813 to Yount teaches the use of a plurality of machines in parallel which in effect comprise a multiple spindle boring arrangement whereby several cylinders may be bored simultaneously. It likewise does not incorporate any novel devices for location of the boring machine over the cylinders to be bored.

U.S. Pat. No. 3,260,136 to Rottler discloses a boring machine and boring bar construction incorporating centering fingers for locating the bar in the cylinder and a counter-weight to improve the operation of its novel cutter construction.

U.S. Pat. No. 3,273,423 also to Rottler is a division of the other Rottler patent which teaches air operation and novel clamping means. U.S. Pat. No. 1,586,500 to Bacon, et al is limited to a cylinder boring tool with driving, feeding and securing mechanism.

U.S. Pat. No. 2,546,957 to Ray, as well as U.S. Pat. No. 2,669,135 to Moore, both teach a machine construction for moving a drilling mechanism in two dimensions for positioning over the work to be drilled. These constructions are for an entirely different purpose and in no way suggest the positioning mechanism of the applicant.

There is nothing in the prior art as known to applicant which suggests applicant's combination of holding and positioning the relation between an engine block and a portable boring machine.

SUMMARY OF THE INVENTION

I have invented a stand and accompanying devices which provide for positioning and holding down a cylinder block of an engine as well as the boring machine used for boring the cylinders. My invention permits the variation in the height of the block, as well as its angle to the horizontal. I provide a movable support for any standard boring machine which retains the machine above the engine block and permits its motion in two directions in a horizontal plane as well as raising and lowering it in a vertical plane. For my plate upon which the boring machine is mounted I provide a novel method of suspension which permits up and down motion of the machine as well as automatically levelling or adjusting it to the top surface of the engine block. The latter may be in a horizontal plane or inclined at any suitable angle to the horizontal as required by the particular engine block.

By use of the mechanisms which form a part of my stand I am thus able to overcome the problems of difficulties and cumbersomeness in handling of the engine block and of properly positioning the boring machine in relation to the cylinders being bored.

DESCRIPTION OF A PREFERRED EMBODIMENT

Figure 1:
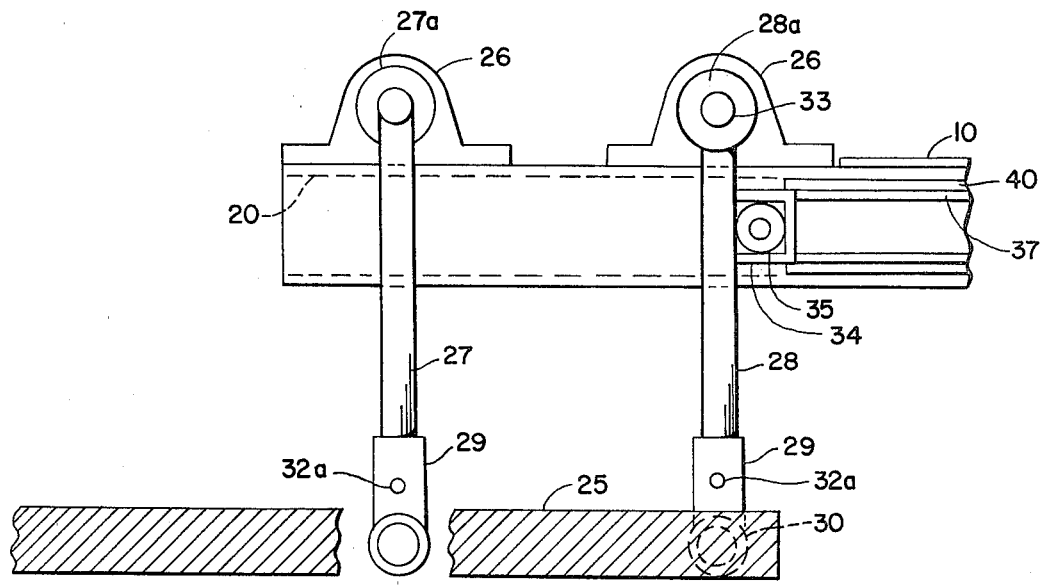
FIG. 1 is an enlarged partial section view through the mounting plate of my stand showing the method of suspension as viewed from lines 1—1 on FIG. 1A.
Figure 1A:
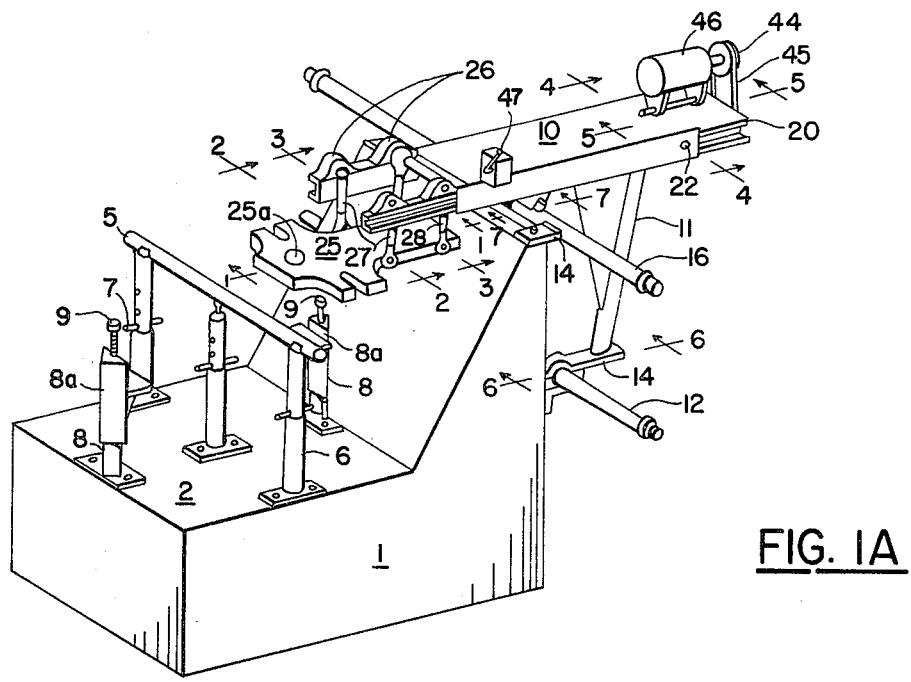
FIG. 1A is a perspective view of the cylinder boring machine stand of my invention.
Figure 1B:
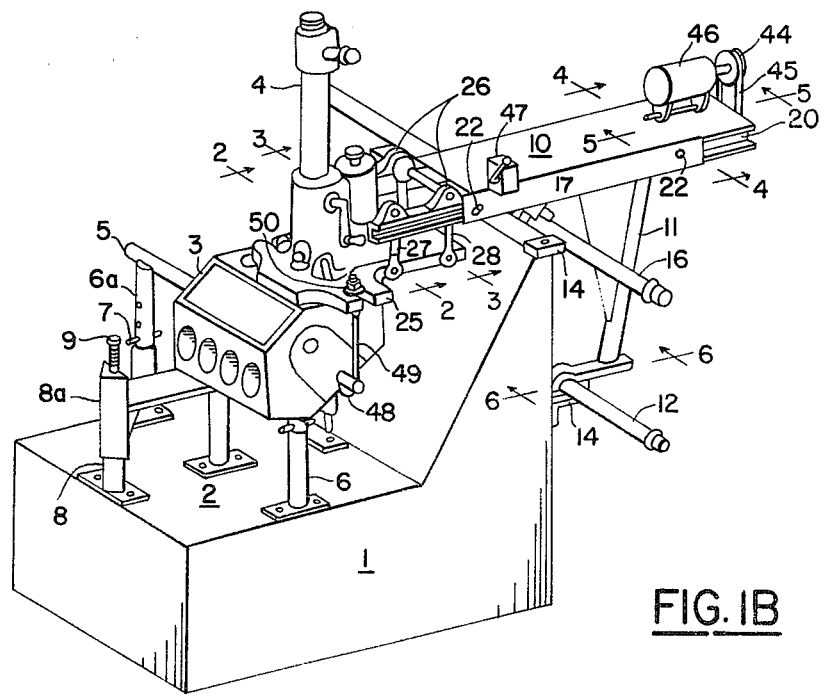
FIG. 1B is the stand of FIG. 1A with an engine cylinder block and boring machine in position on my stand for boring.

Referring now to the figures and especially first to FIG. 1A and FIG. 1B there is seen first the base or body of my stand 1 comprising a bed plate 2 on which is supported the engine block 3 and a portable boring machine 4 which may be of any commercial manufacture. My engine block 3 is supported by means of main bearing or saddle bar 5 which in turn is supported from bed plate 2 by means of vertical supports 6 which have a telescoping component 6a permitting the heights of the supports to be varied and held in position by means of pins 7 through suitable holes in the telescoping section 6a of my supports.

The support of the engine block is augmented and made angularly adjustable by means of supports stands 8 which likewise are of telescopic construction, having slidable members 8a whose height may be varied by means of adjusting screw 9.

For my boring machine I utilize positioning carriage device 10 supported from the main base 1 which in combination with the other elements described below imparts a motion to the boring machine which is transverse to the axis of the engine block or longitudinal when desired.

Figure 6:
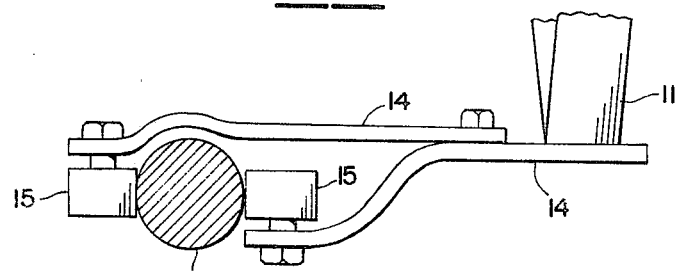
FIG. 6 is an enlarged cross-sectional view of the lower transverse positioning shaft showing means of support as viewed from the lines 6—6 of FIG. 1A and FIG. 1B.

For positioning my boring machine in a direction longitudinal to the engine block I utilize a lower positioning shaft 12 held in position by bearing brackets 14 and lower guide bearings 15 which may be seen in detail on FIG. 6. Strut No. 11 is interposed between the transverse positioning carriage 10 and bracket 14.

Figure 7:
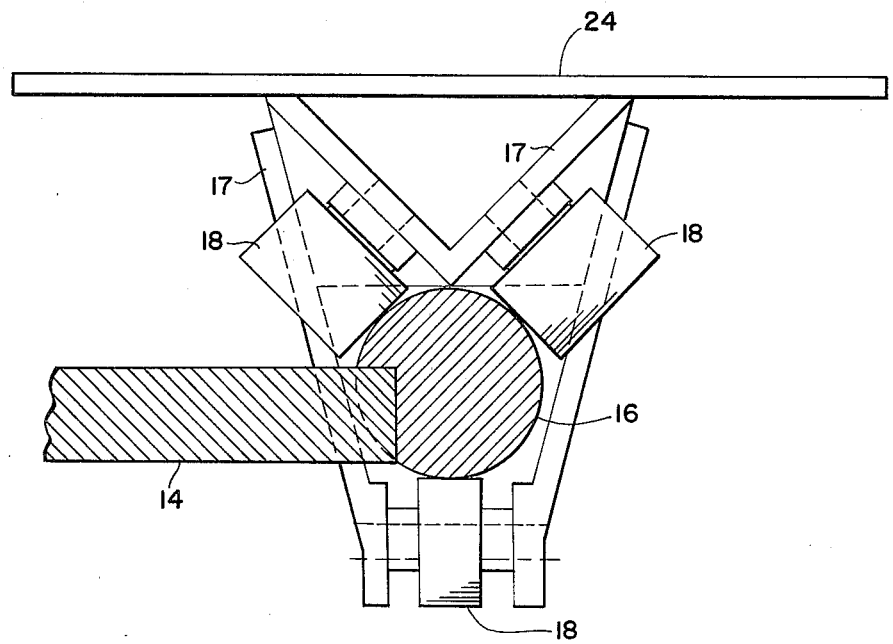
FIG. 7 is an enlarged cross-sectional view of the upper transverse positioning shaft showing its means of support as viewed from the lines 7—7 of FIG. 1A.

Utilized also for longitudinal positioning of my machine is upper longitudinal positioning shaft 16, bearing bracket 17, holding guide bearings 18. This assembly is held in position by means of upper bearing brackets 17 and longitudinal shaft support 14, all of which may be seen in better detail on FIG. 7.

Figure 4:
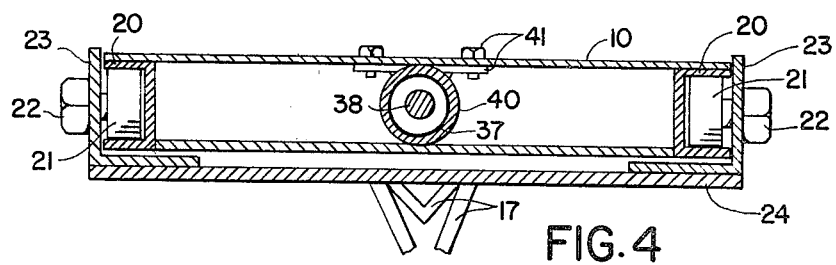
FIG. 4 is an enlarged cross-section through the support positioning carriage as viewed from the lines 4—4 of FIG. 1A and FIG. 1B.

My positioning carriage 10 is equipped with slide channels 20 on opposite edges which contain rollers 21 held in position by bearings 22 which in turn are held in position by bearing supports 23 all mounted on the base 24 of my positioning carriage 10 as seen better on FIG. 4.

An important feature of my invention is represented by the boring machine mounting plate 25 in which there is located hole 25a for the boring machine shaft. This mounting plate may be made an integral part of the boring machine.

Figure 2:
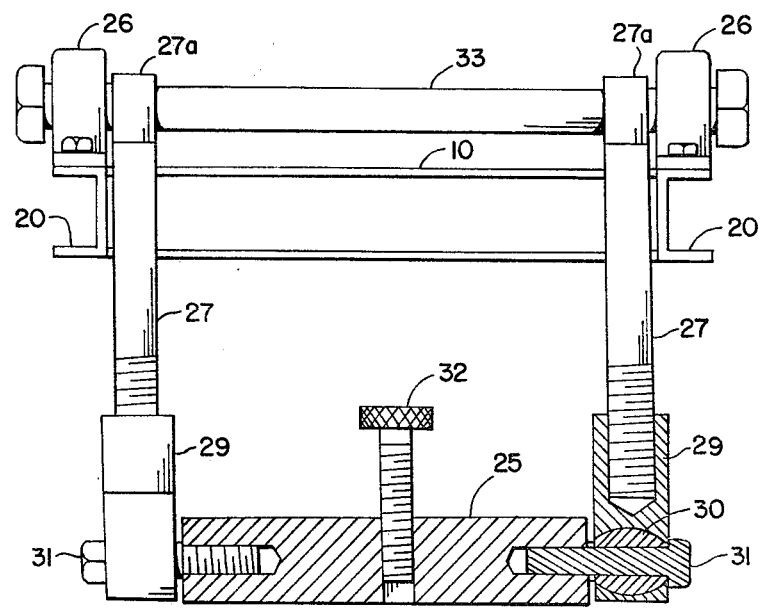
FIG. 2 is an enlarged partial sectional view through the mounting plate of my invention showing the forward suspension means as viewed from the line 2—2 of FIG. 1A and FIG. 1B.
Figure 3:
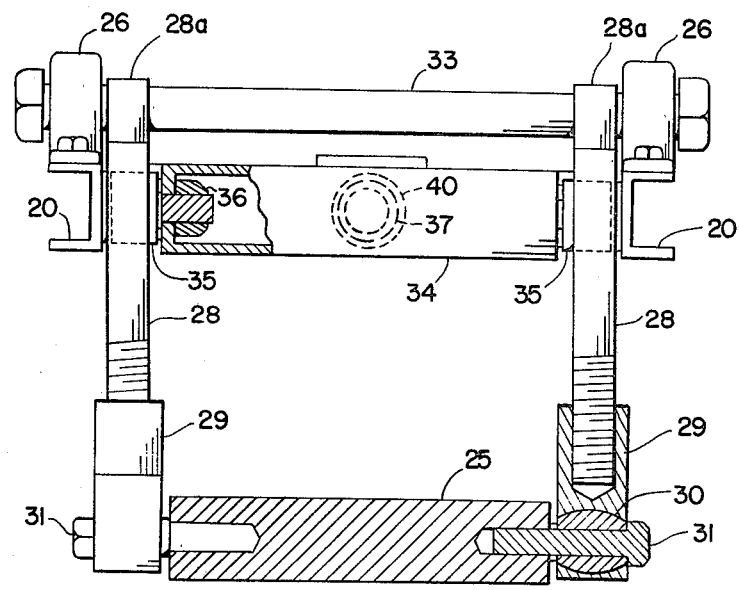
FIG. 3 is an enlarged partial sectional view through the mounting plates showing the rear suspension means as viewed from the line 3—3 of FIGS. 1A and 1B.

Positioned on slide channels 20 are pillow blocks 26. Forward suspension arms 27 pass through forward pillow block 26 and support forward suspension arms 27 equipped with bosses 27a. Rear suspension arms 28 equipped with bosses 28a are suspended for free rotation on shaft 33. These are best seen on FIGS. 1, 2, and 3.

Suspension arms 27 and 28 are equipped with suspension arm sleeves 29 screwed upon suspension arms 27 and 28 respectively and retain spherical bearings 30. The bearings 30 ride on pins 31 which in turn engage mounting plate 25 which is equipped with set screws 32 and 32a. These are also best seen on FIGS. 1, 2, and 3.

The operation of my suspension arms and consequently of the mounting plate 25 is effected through cross-member 34 which engages rear suspension arm bearings 35 which are supported from cross-member 34 by bearing supports 36. These are best seen on FIG. 1 and 3.

Figure 5:
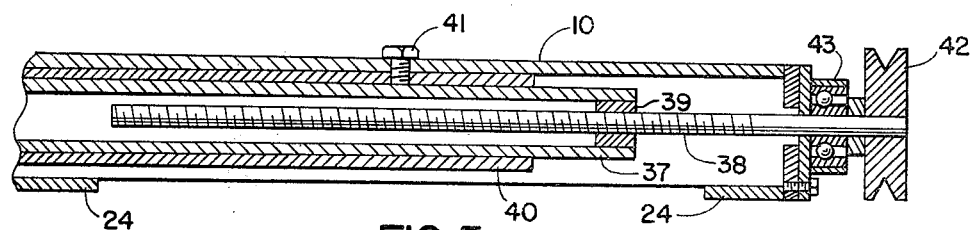
FIG. 5 is an enlarged longitudinal section through the support positioning carriage showing the operating mechanism as viewed from the line 5—5 of FIG. 1A and FIG. 1B.

Referring now to FIGS. 4 and 5 there is seen a detail of the mechanism which operates cross-member 34 and consequently the suspension arms 27 and 28 and mounting plate 25 as mentioned above. Seen here is traveling tube 37 which engages cross-member 34 and is concentric with screw shaft 38 which engages hollow traveling tube 37 through nut 39. Traveling tube 37 rides in sleeve 40 which is held in position by screw fastener 41 engaging the body of the carriage 10. Mounted on screw shaft 38 is pulley 42 which rides in bearing 43 also mounted on carriage 10 so that the rotation of pulley 42 effects the forward and backward motion of tube 37 and consequently cross-member 34 and the suspension arms 28; through followers 35 mounted against the rear of arms 28 by bearing supports 36 mounted on member 34 effecting the lowering and raising of mounting plate 25. I may also use an air, hydraulic or air on hydraulic means to effect this motion.

Referring now to FIGS. 1A and 1B there is seen driving pulley 44, V-belt 45 and electric motor 46 which operates from an electrical source not shown through operating switch 47 which permits rotation in two directions of motor 46.

Figure 8:
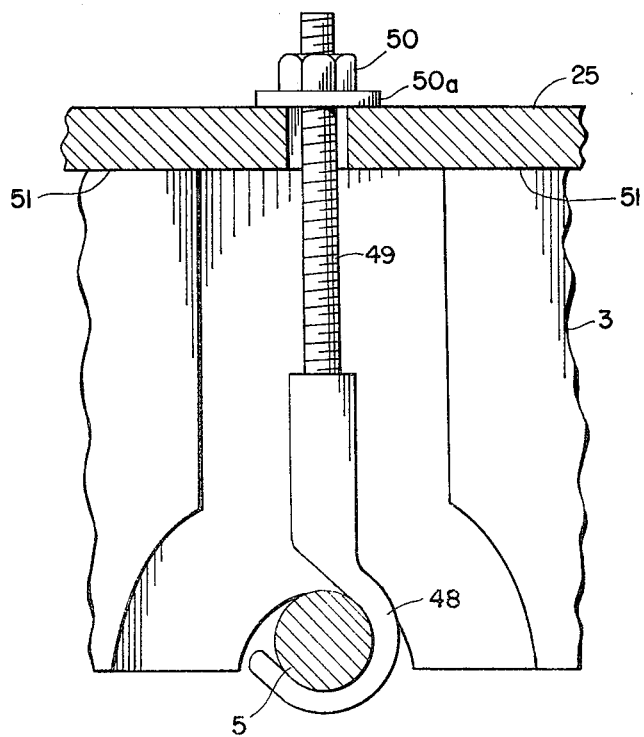
FIG. 8 is an enlarged partial sectional view through the end of my mounting plate showing means of fastening the latter to the cylinder block of FIG. 1B.

Referring now to FIG. 8 there is seen hook 48, threaded shaft 49, nut 50, washer 50a, making contact with the top surface of the block deck of the engine 51. Hook 48 engages the main bearing or saddle bar 5 described above and serves to hold the mounting plate and hence the boring machine down on the engine block. I may also use an air, hydraulic or air on hydraulic cylinder to replace the nut and threaded shaft. The details of the mounting of the boring machine upon the mounting plate are not shown as this will vary with the design and construction of the commercial boring machine which is used. I may even utilize a construction in which this plate is integral with the boring machine.

Figure 9:
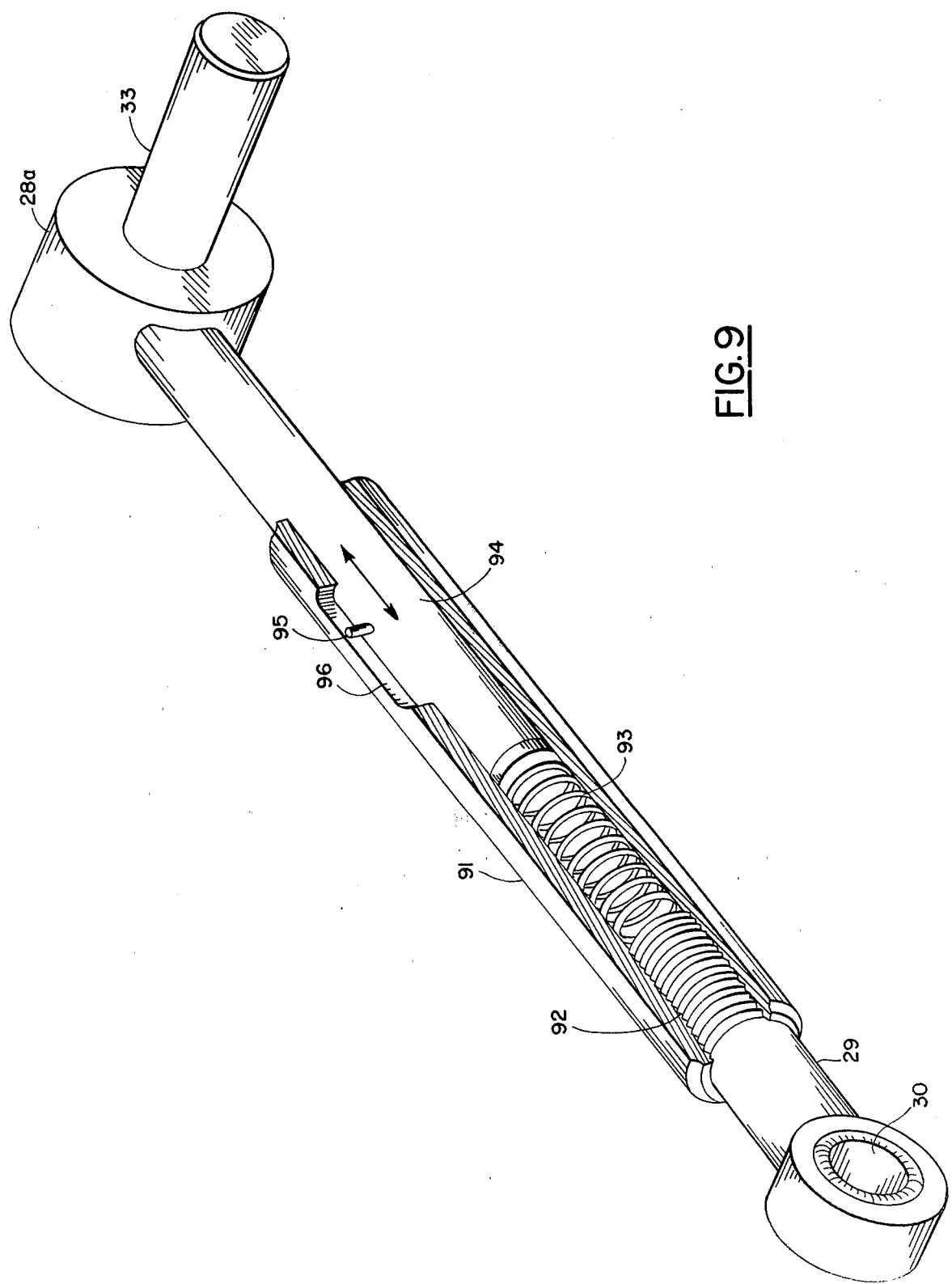
FIG. 9 is a partial cross-section showing an alternate embodiment of the forward or rear suspension arms 27 or 28 for my mounting plate.

To facilitate the self-leveling feature of the mounting plate 25 against the block deck in addition to the spherical bearings 30 mentioned above, I may use the forward or rear suspension arms 27 and 28 construction shown in FIG. 9. With this construction instead of a solid arm I use hollow arms 91 with the screwed section 92 to preload spring 93 and adjust center distance of arms holding bearing 30. Positioned in the hollow portion of sleeve 91 is spring 93 which engages the component of suspension arm 94 which comprises a sliding shaft. The latter is held in position by pin 95 riding in slot 96. In this manner I obtain complete adaption or leveling of the mounting plate 25 and consequently the boring machine to the engine block.

In place of the spring arrangement 93 I may employ a gas-tight cylinder under pressure and an equivalent to the arm 94 acting as a piston to produce the cushioning effect of the spring 93.

Operation

To start the operation I first raise the mounting plate and consequently the boring machine to the uppermost position by operation of the switch 47, motor 46 and the mechanism which it actuates described above. I manually push the complete assembly on the positioning carriage to its rear position. I then adjust by suitable measurements, depending on the size of the block to be bored, the height of the saddle bar supports 6 and 6a, placing the pins in position. Using a suitable lifting device I place the engine block containing the saddle bar upon the saddle bar supports, centering the engine block as close as possible on the stand.

I then adjust the angular position of the engine block where necessary by means of adjustable supports 8 and 8a. The actual support will be modified somewhat depending on whether a V-type or straight in line engine is being worked on and other features of the engine block.

I next manually position the boring machine column over the cylinder by means of the transverse and longitudinal features of my positioning device. I may employ an air, hydraulic or air on hydraulic device for this purpose. I next check the position of the boring block with respect to the cylinder. When this is centrally located I lower the mounting plate by means of the raising and lowering mechanism described above, allowing the mounting plate to self-level to the top surface of the block deck. I then lock the mounting plate by means of the hook shown on FIG. 8. The assembly is now in position for boring and I proceed in accordance with the instructions of the boring machine manufacturer. After the boring is completed I reverse the steps and position the machine over the next cylinder in like manner.

I claim:

1. An apparatus for the boring of engine cylinders comprising:
    a base member of generally right angle configuration having a vertical back section, a horizontal base plate forming parts of said right angular base member, and having two oppositely spaced vertical sides joining said base plate and said back section;
    means for supporting an engine block upon said base plate;
    said engine block having a series of cylindrical bearing housings in a line along a horizontal center line;
    said means for support comprising,
        a pair of vertically adjustable support columns on said base plate engaging opposite ends of said block;
        a positioning shaft through said bearing housings of said block;
        a pair of vertically adjustable support columns supporting opposite ends of said shaft on said base plate;
    means for fastening said engine block to said base plate;
    a movable elongated positioning carriage device positioned upon the top of said vertical back section of said base member;
    said carriage device including means for permitting movement in a longitudinal direction and means for permitting movement in a transverse direction with respect to said base member and said engine block;
    a mounting plate having positioned upon its upper surface a cylinder boring machine;
    said mounting plate being suspended from said positioning carriage device by four parallel arms;
    said arms being supported from said carriage by pivots positioned at the upper end of each arm and mounted on said carriage;
    spherical bearings positioned on the lower end of each arm;
    said bearings engaging said mounting plate on opposite edges thereof;
    means for fastening said mounting plate to said engine block;
    means for imparting an oscillating motion to said arms.

2. The apparatus of claim 1 in which said mounting plate forms an integral part of said boring machine.

3. The apparatus of claim 1 or claim 2 in which said means for fastening said mounting plate and boring machine to said engine block comprises:
    vertical hooked members disposed for engaging opposite ends of said positioning shaft;
    threaded members engaging said hooked members;
    a nut and washer engaging said threaded members and disposed to engage the upper surface of said mounting plate.

4. The apparatus of claim 1 or claim 2 in which said means for imparting an oscillating motion to said arms comprises;
    a threaded shaft engaging a horizontal sleeve through a nut positioned on said sleeve;
    means for rotating said shaft and imparting a horizontal motion to said sleeve through said nut;
    said sleeve being further disposed to engage a horizontal shaft;
    said shaft having its ends pivotally mounted on a first pair of said vertical arms;
    whereby horizontal motion of said sleeve produces parallel oscillation of said arms which produces vertical movement of said mounting plate and boring machine while said plate is in a horizontal position to effect firm contact with the surface of said engine block.

5. The apparatus of claim 1 or claim 2 in which said means for imparting an oscillating motion to said arms comprises:
    a hydraulic ram;
    said ram being disposed to engage a first pair of vertical arms;
    whereby horizontal motion of said ram produces parallel oscillation of said arms which produces vertical movement of said mounting plate and boring machine while said plate is in a horizontal position to effect firm contact with the surface of said engine block.

6. The apparatus of claim 1 or claim 2 in which said means for imparting an oscillating motion to said arms comprises:
    a pneumatic piston and follower;
    said follower being disposed to engage a first pair of vertical arms;
    whereby horizontal motion of said piston and follower produces parallel oscillation of said arms which produces vertical movement of said mounting plate and boring machine while said plate is in a horizontal position to effect firm contact with the surface of said engine block.

7. The apparatus of claim 1 in which said means for permitting moving said carriage in a direction parallel to said center line of said engine comprises:
    an upper horizontal shaft;
    a lower horizontal shaft;
    roller bearings engaging said upper and said lower horizontal shafts;
    bracket means supporting said roller bearings and positioned upon said carriage and upon said vertical back section of said base member.

8. The apparatus of claim 1 in which said means for permitting movement of said carriage in a direction transverse to said base member and said engine block comprises:
    a base plate;
    channel members positioned along opposite edges of said base plate and forming a part of said carriage;
    pillow block bearings positioned upon said channel members and disposed for mounting of the upper ends of said oscillating mounted arms;
    roller bearings, positioned within said channel members and supported from said base plate;
    said channel members and said pillow block being slidably mounted on said base plate;
    a horizontal shaft connecting said channel members and means for moving said shaft forward and backward.

9. In an apparatus for the boring of cylinders of an engine block a device for locating a boring machine in a boring position over said cylinders comprising:
    means for fixedly positioning said engine in a predetermined position with respect to a horizontal center line through the bearing housing of said engine block;
    a movable carriage positioned above said engine;

means to permit movement of said carriage in a direction parallel to the horizontal center line of said engine;

means to permit moving horizontally said carriage in a direction perpendicular to said center line;

a mounting plate with a boring machine positioned thereupon;

said plate being suspended from pivots on said carriage by four parallel vertical arms;

said arms being disposed to swing on said pivots on said carriage and the opposite end of each of said arms having a spherical bearing positioned thereon and engaging opposite edges of said plate;

means for oscillating said arms in a vertical plane, whereby longitudinal, transverse and vertical parallel motion may be imparted to said plate and said boring machine, thereby facilitating location of said machine over the cylinder to be bored.

10. In an apparatus for the boring of the cylinders of an engine block a device for facilitating the positioning of a boring machine over a cylinder to be bored comprising:

a horizontal mounting plate and boring machine disposed for positioning above said cylinder;

means for mounting said boring machine and said plate above said cylinder;

means for suspending said plate and boring machine from a movable slide positioned above said cylinder;

said means comprising two pairs of vertical parallel suspension arms mounted upon said slide at their upper ends through pivots positioned thereon;

the lower ends of each pair of said arms having spherical bearings positioned thereon engaging opposite edges of said mounting plate and boring machine;

means for imparting an oscillating motion to said arms about said upper ends, whereby said plate and boring machine may be raised and lowered while maintaining its horizontal position to effect contact with the surface of said engine block.

11. The apparatus of claim 10 in which said vertical parallel suspension arms comprise a forward pair and a rearward pair of arms, said arms beiing positioned adjacent to said engine block and being characterized by:

an intermediate hollow section;

an upper solid section slidably mounted within said hollow section and comprising said pivoted ends;

a lower solid section fixedly positioned within said lower section and comprising said mounting plate and boring machine engaging ends;

a spring positioned within said hollow section and interposed between said upper and lower solid sections, whereby the self-leveling feature of the mounting plate if facilitated.

12. The apparatus of claim 10 in which said vertical suspension arms comprise a forward pair and a rearward pair of arms, said arms being positioned adjacent to said engine block and being characterized by:

an intermediate hollow section;

an upper solid section slidably mounted within said hollow section and comprising said pivoted ends;

a lower section fixedly positioned within said lower section and comprising said mounting plate and boring machine engaging ends;

a space between said upper and said lower sections; said space comprising a gas-tight enclosure.

* * * * *